United States Patent
Park et al.

(10) Patent No.: US 9,341,185 B2
(45) Date of Patent: May 17, 2016

(54) SURFACE TREATING AGENT FOR WEAR-RESISTANCE SURFACE, MANUFACTURING METHOD THEREOF AND COMPRESSOR USING THE SAME

(71) Applicants: Jinsung Park, Seoul (KR); Chuljig Bae, Seoul (KR); Eunsoo Yang, Seoul (KR); Byeongchul Lee, Seoul (KR); Youngkyun Lim, Seoul (KR); Daesoon Lim, Seoul (KR); Seungkoo Lee, Seoul (KR)

(72) Inventors: Jinsung Park, Seoul (KR); Chuljig Bae, Seoul (KR); Eunsoo Yang, Seoul (KR); Byeongchul Lee, Seoul (KR); Youngkyun Lim, Seoul (KR); Daesoon Lim, Seoul (KR); Seungkoo Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 106 days.

(21) Appl. No.: 14/032,217

(22) Filed: Sep. 20, 2013

(65) Prior Publication Data
US 2014/0086776 A1   Mar. 27, 2014

(30) Foreign Application Priority Data
Sep. 24, 2012  (KR) .................. 10-2012-0106082

(51) Int. Cl.
| | | |
|---|---|---|
| C08K 3/04 | (2006.01) | |
| F04C 2/02 | (2006.01) | |
| C09D 127/18 | (2006.01) | |
| C08K 7/24 | (2006.01) | |
| F16C 33/20 | (2006.01) | |
| F04C 29/02 | (2006.01) | |
| F04C 18/02 | (2006.01) | |

(52) U.S. Cl.
CPC ... *F04C 2/02* (2013.01); *C08K 3/04* (2013.01); *C08K 7/24* (2013.01); *C09D 127/18* (2013.01); *F04C 18/0215* (2013.01); *F04C 29/02* (2013.01); *F16C 33/201* (2013.01); *F16C 33/208* (2013.01); *F04C 2230/91* (2013.01); *F05C 2225/04* (2013.01); *F16C 2208/02* (2013.01)

(58) Field of Classification Search
None
See application file for complete search history.

(56) References Cited

U.S. PATENT DOCUMENTS

| | | | | |
|---|---|---|---|---|
| 7,732,029 | B1* | 6/2010 | Moorlag et al. | 428/36.9 |
| 7,943,065 | B2* | 5/2011 | El Bounia | 252/511 |
| 2009/0305031 | A1* | 12/2009 | Picardi et al. | 428/323 |
| 2010/0233371 | A1 | 9/2010 | Kim et al. | |
| 2010/0298600 | A1* | 11/2010 | Lee | 562/523 |
| 2011/0143143 | A1 | 6/2011 | Qi et al. | |

(Continued)

FOREIGN PATENT DOCUMENTS

| | | |
|---|---|---|
| CN | 1757924 A | 4/2006 |
| CN | 102022544 A | 4/2011 |

(Continued)

OTHER PUBLICATIONS
Chinese Office Action issued in application No. 201310439069.X dated Nov. 4, 2014. (Office Action and English Translation).

(Continued)

*Primary Examiner* — Nicole M Buie-Hatcher
(74) *Attorney, Agent, or Firm* — Ked & Associates, LLP (57) ABSTRACT

The present disclosure relates to a wear-resistant surface treating agent, a manufacturing method thereof, and a compressor using the same. According to one aspect of the present disclosure, the surface treating agent includes an organic solvent, nanodiamond powder and carbon nanotube powder dispersed in the organic solvent, and a PTFE solution mixed with the organic solvent, wherein the organic solvent is an amide-based organic solvent.

12 Claims, 4 Drawing Sheets

(56) References Cited

U.S. PATENT DOCUMENTS

2012/0261182 A1 * 10/2012 Megaridis et al. ............ 174/388
2014/0094546 A1 * 4/2014 Myllymaki et al. .......... 524/104

FOREIGN PATENT DOCUMENTS

| JP | 2005-007622 | 1/2005 |
| JP | 10-0840464 | 6/2008 |
| KR | 10-0840464 | 6/2008 |
| KR | 946403 B1 * | 3/2010 |
| KR | 10-2010-0103242 | 9/2010 |

OTHER PUBLICATIONS

European Search Report dated Dec. 17, 2013.
Korean Office Action dated Jan. 23, 2014.

* cited by examiner

SURFACE TREATING AGENT FOR WEAR-RESISTANCE SURFACE, MANUFACTURING METHOD THEREOF AND COMPRESSOR USING THE SAME

CROSS-REFERENCE TO RELATED APPLICATION

Pursuant to 35 U.S.C. §119(a), this application claims the benefit of earlier filing date and right of priority to Korean Application No. 10-2012-0106082, filed on Sep. 24, 2012, the contents of which is incorporated by reference herein in its entirety.

BACKGROUND OF THE DISCLOSURE

1. Field of the Disclosure

This specification relates to a surface treating agent with wear-resistance, a manufacturing method thereof, and a compressor using the same, and more particularly, a surface treating agent for forming a wear-resistant layer on a surface of a predetermined metal, a manufacturing method thereof, and a compressor having a wear-resistant layer using the agent.

2. Background of the Disclosure

Various methods have been studied to reduce friction which is generated between two surfaces which perform a relative motion each other. As a widely used method for reducing such friction, lubricating oil may be supplied or a bearing may be interposed between two surfaces. Besides, a method of forming a surface with superior lubricity on one or both of two surfaces, instead of using the bearing, has also been used.

To form the surface, a surface treating agent which is coated on a surface for providing lubricity is used. A representative one is polytetrafluoroethylene (PTFE), so-called Teflon.

The PTFE material is used in the whole industrial field, such as machinery, various types of tools, kitchen equipment and the like, by virtue of peculiarly low friction characteristics. However, it is not individually used due to an extremely weak mechanical strength. The PTFE is rather used by being mixed with a different type of material, such as plastic, carbon black, organic-inorganic pigment or the like, which functions as a binder. However, when such additive is mixed, the PTFE does not achieve desired material properties. When the PTFE is mixed with a large quantity of glass fibers or carbon fibers in order to intensify only the mechanical strength, the use of the PTFE is limited due to a drastic increase in a coefficient of friction.

As one method of compensating for the drawbacks of the PTFE material, as introduced in Korea Patent Application No. 10-2009-0021770 (Name of the Invention: PTFE coating agent, a manufacturing method thereof and a use method thereof), a method of using a PTFE material by adding nano-diamond powder therein has been proposed. The nano-diamonds are generally manufactured by a high temperature and high pressure process, a synthesis using shock waves, chemical vapor deposition (CVD), detonation and the like, and a structure of the nano-diamond is composed of internal crystalline diamond phase and an external amorphous carbon phase. The Patent Application is expecting to increase intensity of a lubricating layer, which is generated by adding the nano-diamond powder into the PTFE material.

The above references are incorporated by reference herein where appropriate for appropriate teachings of additional or alternative details, features and/or technical background.

SUMMARY OF THE DISCLOSURE

Therefore, an aspect of the detailed description is to provide a surface treating agent, capable of forming a surface with higher wear-resistance than the related art, and obtaining a surface with uniform material properties in such a manner that additives are evenly dispersed within polytetrafluoroethylene (PTFE).

Another aspect of the detailed description is to provide a manufacturing method for the surface treating agent.

Another aspect of the detailed description is to provide a compressor having a lubricating surface formed by using the surface treating agent.

To achieve these and other advantages and in accordance with the purpose of this specification, as embodied and broadly described herein, there is provided a surface treating agent including an organic solvent, nanodiamond powder and carbon nanotube powder dispersed in the organic solvent, and a PTFE solution mixed with the organic solvent. The organic solvent may be an amide-based organic solvent.

Here, the nanodiamond powder and the carbon nanotube powder may be mixed such that a total weight of the solids corresponds to 0.1 to 5% by weight of the PTFE solution.

Also, the nanodiamond powder and the carbon nanotube powder may be mixed in a ratio of 4:6 to 6:4.

The amide-based organic solvent may include N,N-dimethylformamide (DMF).

To achieve these and other advantages and in accordance with the purpose of this specification, as embodied and broadly described herein, there is provided a method for manufacturing a surface treating agent including a first step of dispersing nanodiamond powder into a solvent, a second step of adding carbon nanotube powder into the nanodiamond solution, a third step of injecting a dispersing agent into the solution containing the added nanodiamond powder and carbon nanotube powder, a fourth step of dispersing the nanodiamond powder and the carbon nanotube powder in the dispersing agent-introduced solution, and a fifth step of mixing the dispersing solution, with the nanodiamond powder and the carbon nanotube powder dispersed therein, with a polytetrafluoroethylene (PTFE) solution.

Here, the first step may include introducing the nanodiamond powder into a polar solvent, and dispersing the nanodiamond powder into the polar agent using attrition milling.

Also, 0.1 to 5.0% by weight of the nanodiamond powder may be introduced with respect to 100% by weight of the polar solvent.

The nanodiamond powder may be milled to have a particle diameter in the range of 0.1 to 1 mm upon the attrition milling.

In the third step, 1 to 5% by weight of the dispersing agent may be introduced with respect to solids of the carbon nanotube powder.

The dispersing agent may be one of surfactant, a polymer coating agent or a silane coupling agent.

In the fourth step, the nanodiamond powder and the carbon nanotube powder may be dispersed using an ultrasonic dispersion system.

Also, the fourth step may be executed for 1 to 60 minutes using the ultrasonic dispersion system.

To achieve these and other advantages and in accordance with the purpose of this specification, as embodied and broadly described herein, there is provided a scroll compressor including a casing, a main frame fixed to the casing and having a shaft insertion opening, a fixed scroll fixed to the casing and located on the main frame, an orbiting scroll forming a compression chamber together with the fixed scroll and having a boss on a lower surface thereof, a rotation shaft having an end portion inserted through the shaft insertion opening to be fixedly inserted into the boss, and a lubricating layer formed in the shaft insertion opening or the boss, wherein the lubricating layer may be formed by coating the aforementioned surface treating agent and sintering the coated surface treating agent.

Here, the surface treating agent may be coated by screen printing, spray coating, flow coating or the like.

The sintering may be executed at temperature in the range of 100 to 300° C.

In accordance with another aspect of the present disclosure, there is provided a scroll compressor including a casing, a fixed scroll fixed to the casing and having a shaft insertion opening, an orbiting scroll disposed above the fixed scroll to form a compression chamber together with the fixed scroll, and having a boss, a rotation shaft having an upper end portion penetrating through the shaft insertion opening to be fixedly inserted into the boss, and a lubricating layer formed in the shaft insertion opening or the boss, wherein the lubricating layer may be formed by coating the aforementioned surface treating agent and sintering the coated surface treating agent.

In accordance with those aspects of the present disclosure having such configurations, wear-resistance and a lifespan of a surface-treated lubricating layer may be enhanced in such a manner of acquiring high hardness and high strength as characteristics of nanodiamonds and improving sheer stress of a coated layer by further adding carbon nanotube powder as a filler into a PTFE material.

In addition, an even dispersion effect was difficult to be obtained due to strong coherences of the nanodiamonds and carbon nanotubes. However, the nanodiamonds and the carbon nanotubes may be dispersed together with the dispersing agent after being introduced into a solvent, which may facilitate the nanodiamond and nanotube powder to react with the dispersing agent and accordingly allow such powder to be evenly dispersed in the solvent.

Also, by forming a lubricating layer utilizing the surface treating agent, without use of a bearing which has been used in the existing scroll compressor, a space occupied by the bearing can be utilized. The space may be used for improving a compression ratio and reducing a size of the compressor. In addition, the space may contribute to improvement of design flexibility of the compressor.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

The embodiments will be described in detail with reference to the following drawings in which like reference numerals refer to like elements wherein.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

As described above, to compensate for low mechanical properties of the existing PTFE material, attempts to use the PTFE material by adding a filler such as nanodiamonds and the like have been made. However, the nanodiamond has a particle diameter of 4 to 10 nm and are present in a strongly cohered (aggregated) form into a size of several hundreds of nm to several μm due to a wide specific surface area of nanoparticles. Therefore, the nanodiamonds are difficult to be evenly dispersed in a solvent. Also, high strength and high hardness have been obtained by the addition of the nanodiamonds, but a surface treating agent for forming a lubricating layer having a much higher performance is still required.

Specifically, for a bearing supporting a rotation shaft, perpendicular stress applied to a surface in a perpendicular direction and sheer stress applied in parallel to the surface should be taken into account. However, it has been difficult to satisfy the requirement for the sheer stress using the nanodiamond powder.

Living up to the requirement, the present inventors have recognized through studies that an addition of carbon nanotube powder can result in improvement of sheer stress. The carbon nanotubes are generally manufactured using chemical vapor deposition (CVD). The carbon nanotube has a structure in which two dimensionally arranged carbon atoms are rolled into a cylindrical shape. The carbon nanotubes may be categorized as single-walled carbon nanotubes, dual-walled carbon nanotube, and multi-walled carbon nanotube according to the number of rolled cylinders. The carbon nanotubes composed of the carbon atoms have higher hardness and strength than many other materials, which have been currently known, by virtue of a strong covalent bond between carbon atoms.

However, a problem is that the carbon nanotubes are difficult to obtain uniform material properties due to having much higher coherence than nanodiamonds. However, the present inventors' studies have showed that when dispersion is executed after nanodiamond powder and carbon nanotube powder are mixed with each other, the nanodiamond powder destroys and changes the bond of surfaces of the carbon nanotubes, and this facilitates for the dispersion.

Figure 1:
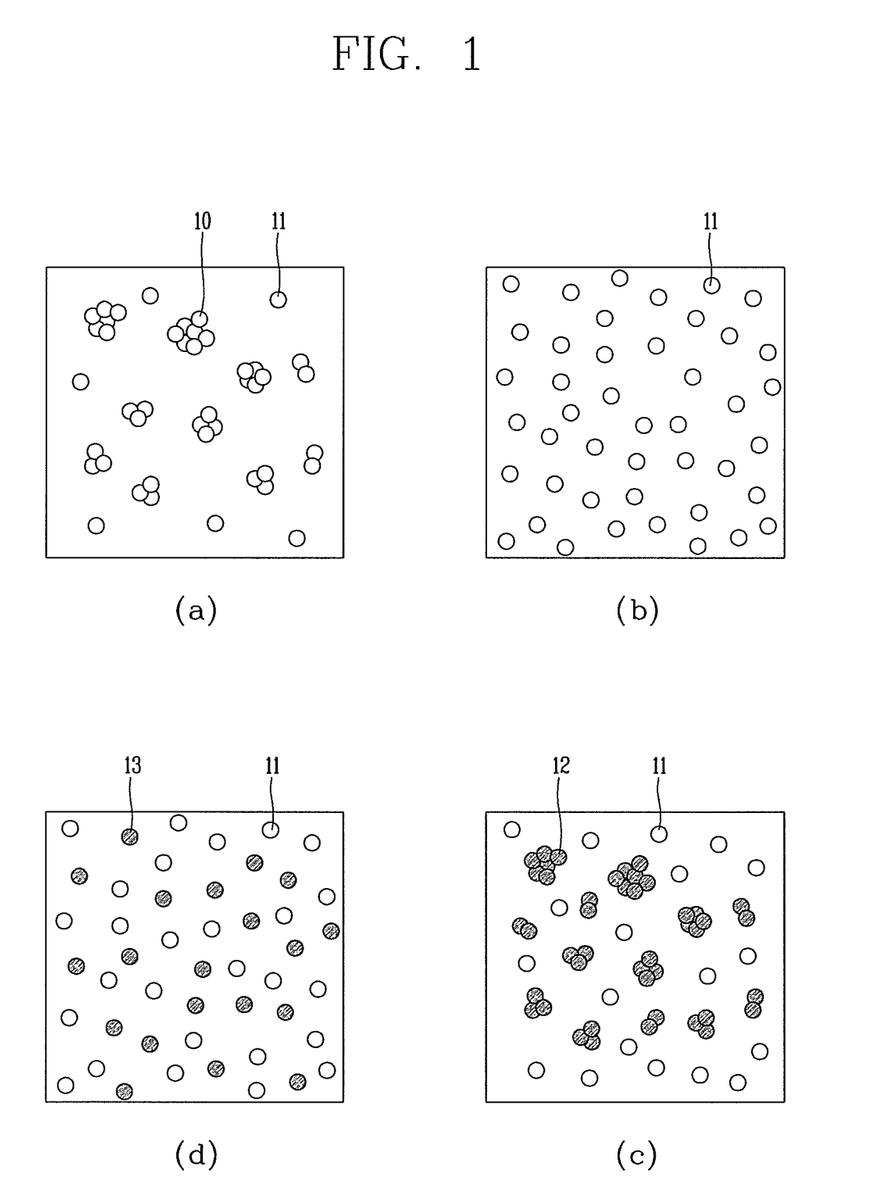
FIG. 1 is a flowchart schematically illustrating a manufacturing process of a method for manufacturing a surface treating agent in accordance with one exemplary embodiment of the present disclosure.

FIG. 1 is a flowchart schematically illustrating a manufacturing process of a method for manufacturing a surface treating agent in accordance with one exemplary embodiment of the present disclosure. A first step may be a step of dispersing nanodiamond powder into an organic solvent. As illustrated in FIG. 1A, when the nanodiamond powder is introduced into an amide-based organic solvent, particles may be aggregated with each other and accordingly may not be evenly dispersed. That is, particles 10 which are aggregated without being dispersed and dispersed particles 11 may be present together in the solvent. In this state, the nanodiamond powder may be evenly dispersed within the solvent using attrition milling. Here, an example of the amide-based organic solvent may include N-methylpyrrolidone (NMP), N,N-dimethylformamide (DMF) or the like.

Here, upon the attrition milling, the nanodiamonds may be milled using beads with a particle diameter of 0.1 to 1 mm. 0.1 to 5.0% by weight of the nanodiamond powder may be dispersed with respect to 100% by weight of the solvent. When the content of the nanodiamond powder is below 0.1% by weight, an expected effect may not be observed due to the insufficient content of the nanodiamond powder. Also, when the content of the nanodiamond powder is over 5% by weight, the nanodiamond powder may be difficult to be separated from the milling beads. Upon completion of the attrition milling, as illustrated in FIG. 1B, the dispersed particles 11 may be evenly distributed within the solvent.

Figure 2:
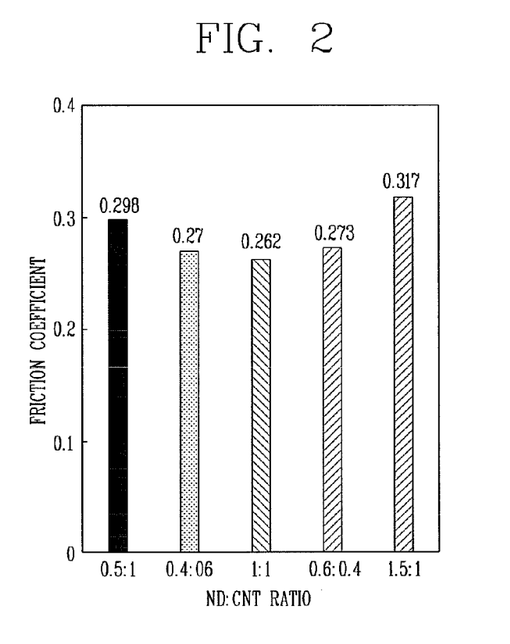
FIG. 2 is a graph illustrating a change in a friction coefficient according to a content ratio of nanodiamond powder and carbon nanotube powder.

In a second step, carbon nanotube powder may be added into the organic solvent in which the nanodiamond powder has been dispersed (see FIG. 1C). The added carbon nanotube powder may exist as aggregated particles 12. Here, the nanodiamond powder and the carbon nanotube powder may be added in a ratio of 4:6 to 6:4. FIG. 2 is a graph illustrating a change in friction coefficient of the lubricating layer according to a content ratio of the nanodiamond powder and the carbon nanotube powder. As illustrated in FIG. 2, when both are mixed in a ratio of 1:1, the lubricating layer may have the lowest friction coefficient and thus exhibit the best lubrication performance. Also, even in the content ratio of 4:6 or 6:4, the lubricating layer may have the similar friction coefficient. When the content ratio is smaller than 4:6 or greater than 6:4, the friction coefficient may drastically increase. Therefore, the particles should be added within the range of the content ratio.

In a third step, a dispersing agent may be introduced into the organic solvent containing the nanodiamond powder and the carbon nanotube powder. As the dispersing agent, surfactant, a polymer coating agent or a silane coupling agent may be used. The dispersing agent may be added by 1 to 5% by weight with respect to solids of the carbon nanotube powder. The dispersing effect may not be sufficiently observed when the dispersing agent is contained less than 1% by weight, and the material properties of the finally manufactured product may be lowered when the content of the dispersing agent is over 5% by weight.

In a fourth step, the mixture mixed with the dispersing agent may be dispersed using an ultrasonic dispersion system. The nanodiamond particles and the carbon nanotube particles may be vibrated by ultrasonic waves. Due to the vibration, the nanodiamond particles and the carbon nanotube particles may be bumped against each other. This may cause the bond of the surfaces of the carbon nanotubes to be destroyed and changed, facilitating the carbon nanotubes to react with the dispersing agent.

An appropriate dispersing time using the ultrasonic waves may be 1 to 60 minutes. The dispersion state may not be good when the dispersion time is below 1 minute, and material properties may be lowered due to the destroy of the carbon nanotubes when the dispersing time is over 60 minutes. When the ultrasonic dispersion is completed, the nanodiamond particles 11 and the carbon nanotube particles 13 dispersed in the solvent may be evenly distributed.

In a fifth step, the organic solvent, in which the nanodiamond particles 11 and the carbon nanotube particles 13 are evenly dispersed, may be mixed with a PTFE coating solution. Here, a total weight of solids of the carbon nanotube powder and the nanodiamond powder may be 0.1 to 5% by weight with respect to the weight of the PTFE solution. When the total weight of the solids is less than 0.1% by weight, a reinforcing effect may not be exhibited. When the total weight is over 5% by weight, brittleness may be generated.

An example of the present disclosure has been manufactured under the following condition by the aforementioned manufacturing process. In addition, as comparative examples, surface treating agents have been manufactured by adding only a PTFE, only carbon nanotube powder, and only nanodiamond powder, respectively.

EXAMPLE

Nanodiamond powder, carbon nanotube powder and an oil-based PTFE solution are prepared. An attrition milling process is executed by putting 0.25 g, 0.5 g, 0.75 g, and 1 g of nanodiamonds into 200 ml of NMP, respectively. Here, 0.25 g, 0.5 g, 0.75 g, and 1 g of nanodiamonds are put into 200 ml of NMP, respectively, and dispersed using an ultrasonic dispersion system. 0.5%, 1%, 1.5% and 2% by weight of the total (sum) of the dispersed nanodiamond powder and carbon nanotube powder are mixed, respectively, with respect to 100 g of the PTFE coating solution, followed by mechanical stirring. Each surface treating agent is coated on a gray cast iron substrate using spray coating, and then sintered at 250° for 30 minutes.

First Comparative Example

A PTFE coating solution is coated on a gray cast iron substrate using spray coating, and then sintered at 250° for 30 minutes.

Second Comparative Example 0.5 g, 1 g, 1.5 g and 2 g of carbon nanotube powder are put into 200 ml of NMP, respectively, and dispersed using an ultrasonic dispersion system. Afterwards, 0.5%, 1%, 1.5% and 2% by weight of the total of the dispersed carbon nanotube powder are mixed, respectively, with respect to 100 g of a PTFE coating solution, followed by mechanical stirring. Each surface treating agent is coated on a gray cast iron substrate using spray coating, and then sintered at 250° for 30 minutes.

Third Comparative Example 0.25 g, 0.5 g, 0.75 g and 1 g of nanodiamonds are put into 200 ml of NMP, respectively, and then dispersed by attrition milling. Afterwards, 0.5%, 1%, 1.5% and 2% by weight of the total of the dispersed nanodiamond powder are mixed, respectively, with respect to 100 g of the PTFE coating solution, followed by mechanical stirring. Each surface treating agent is coated on a gray cast iron substrate using spray coating, and then sintered at 250° for 30 minutes.

Figure 3:
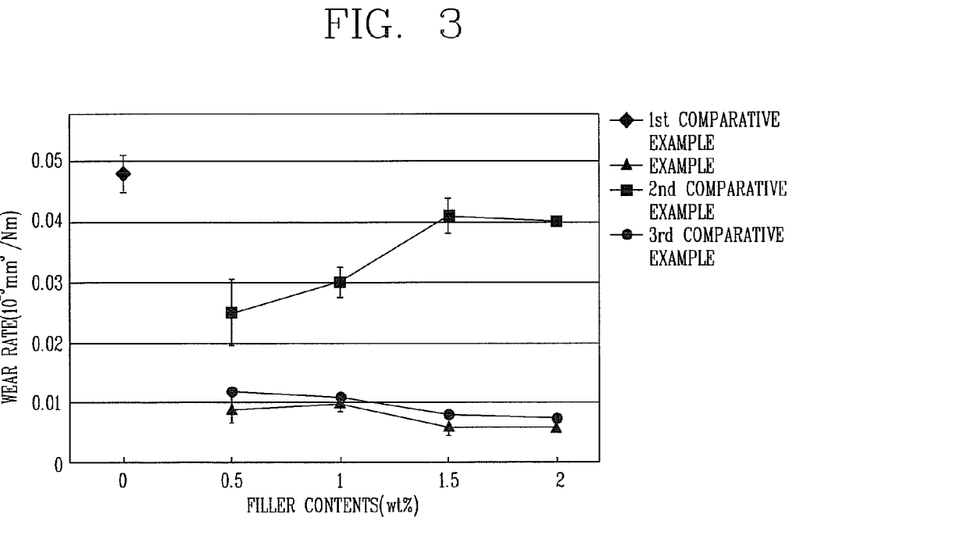
FIG. 3 is a graph illustrating measurement results of wear-resistance performances of a surface treating agent according to one exemplary embodiment of the present disclosure and a surface treating agent according to the related art.

A wear test was carried out with respect to each of the manufactured examples under the following conditions, and the test results were shown in FIG. 3.

| Counterpart | Steel ball (Ra ≤ 0.01 μm) |
|---|---|
| Load | 5N |
| Time | 60 min |
| Velocity | 500 rpm |
| Atmosphere | Room Temperature/Atmosphere Environment |
| Humidity | 40% |

First, in the above Example, when the content of the nanodiamond powder and the carbon nanotube powder exceeds 1.5% by weight, it has been noticed that improvement of wear-resistance is saturated to some degree. It has also been noticed that a lubricating layer formed in the Example exhibits a more excellent wear rate than those of lubricating layers formed respectively in the first, second and third Comparative Examples.

This can be interpreted as resulting from a hardening effect of a base material by the nanodiamonds and a reinforcing effect of tensile strength and sheering strength by the carbon nanotubes. Also, comparing the Example with the second Comparative Example, the second Comparative Example, in which only the carbon nanotube powder is added, first exhibits the lowest wear rate in a sample with 0.5% by weight of the carbon nanotube powder added thereto and the effect is gradually decreasing. This is because dispersibility is reduced in response to an increase in the added quantity. On the contrary, for a sample, in which the carbon nanotube powder and the nanodiamond powder are mixed, a high effect has been noticed even when the content of the additives increase high. This shows that basic dispersibility has also been enhanced by the addition of the nanodiamond powder upon dispersion.

In addition, it has been confirmed that the sample with the mixed carbon nanotube powder and nanodiamond powder added thereto has wear resistance superior to that of the third Comparative Example in which only the nanodiamond powder is added.

The thusly manufactured surface treating agent may be utilized for forming a lubricating layer by being coated on surfaces of various types of mechanical components.

Figure 4:
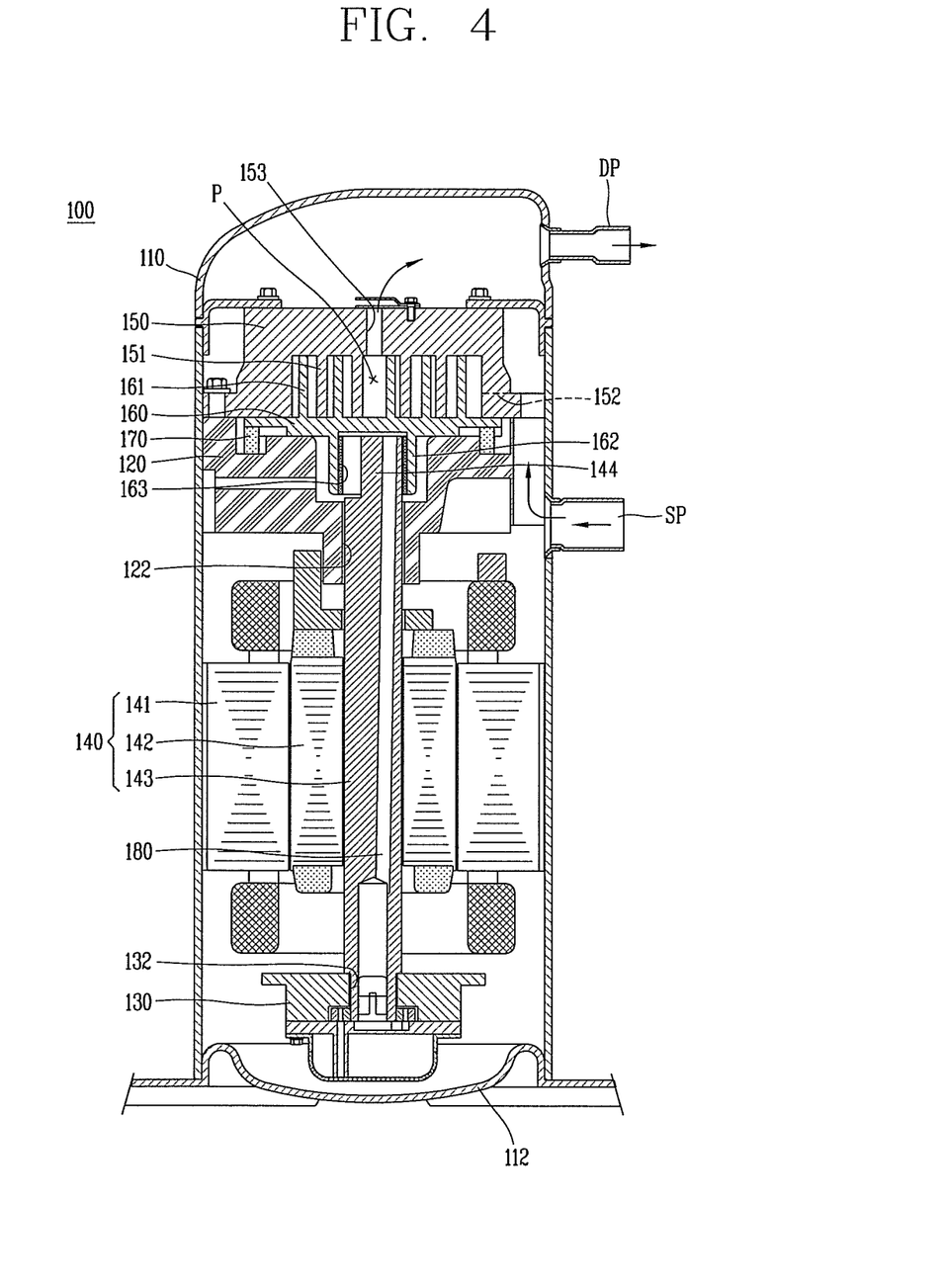
FIG. 4 is a sectional view schematically illustrating an internal structure of a scroll compressor, to which one exemplary embodiment of a surface treating agent according to the present disclosure is applied.

FIG. 4 is a sectional view schematically illustrating an internal structure of a scroll compressor, to which one exemplary embodiment of a surface treating agent according to the present disclosure is applied. FIG. 4 illustrates a scroll compressor but the present disclosure may not be limited to this. It may be obvious that the present disclosure can be applied even to any type of compressor using a bearing for reducing wear resistance against a rotation shaft. As illustrated in FIG. 4, a compressor 100 may include a main frame 120 and a sub frame 130 installed in a hermetic container 110, a driving motor 140 as a driving unit installed between the main frame 120 and the sub frame 130, and a compression unit having a fixed scroll 150 and an orbiting frame 160 both coupled to the driving motor 140 above the main frame 120 so as to compress a refrigerant.

The driving motor 140 may include a stator 141 on which a coil is wound, a rotor 142 rotatably inserted into the stator 141, and a rotation shaft 143 press-fitted in a center of the rotor 142 to transfer a rotation force to the compression unit.

A driving pin 144 may protrude from an upper end of the rotation shaft 143 to be eccentric from a center of rotation of the shaft.

The compression unit may include a fixed scroll 150 fixed to an upper surface of the main frame 120, an orbiting scroll 160 laid on an upper surface of the main frame 120 to be engaged with the fixed scroll 150, and an Oldham ring 170 located between the orbiting scroll 160 and the main frame 120 to prevent a rotation of the orbiting scroll 160.

The fixed scroll 150 may have a fixed wrap 151, which is spirally extending to form a compression chamber P together with an orbiting wrap 161, which will be explained later. The orbiting scroll 160 may have the orbiting wrap 161, which is spirally extending to form the compression chamber P by being engaged with the fixed wrap 151. A boss 162, which is coupled to the rotation shaft 143 to transfer a rotation force, may protrude from a lower surface of the orbiting scroll 160, namely, from an opposite side surface to the surface with the orbiting wrap 161.

A first bearing layer 163, which is disposed to face an outer circumferential surface of the driving pin 144 of the rotation shaft 143, may be formed in the boss 162 of the orbiting scroll 160. The first bearing layer 163 may be formed by coating the surface treating agent on an inner surface of the boss 162, so as to reduce friction between the rotation shaft 143 and the orbiting scroll 160.

In detail, the surface treating agent may be coated onto the inner surface of the boss 162 by screen printing, spray printing, or flow coating and then sintered at temperature in the range of 100 to 300° C., thereby forming the first bearing layer 163.

A second bearing layer 122 may also be formed in the main frame 120 to reduce friction between the rotation shaft 143 and the main frame 120. Also, a third bearing layer 132 may be disposed in the sub frame 130. Oil may be supplied onto the first to third bearing layers 163, 122 and 132 so as to implement a smooth lubricating effect.

When the rotation shaft 143 is rotated by applying power to the driving motor 140, the orbiting scroll 160 which is eccentrically coupled to the rotation shaft 143 may execute an orbiting motion along a predetermined track. Accordingly, a compression chamber P, which is formed between the orbiting scroll 160 and the fixed scroll 150, may continuously be moved toward a center of the orbiting motion. During this movement, the volume of the compression chamber P may be decreasing. Accordingly, a refrigerant may be sucked, compressed and discharged in a continuous manner.

During such processes, an appropriate amount of oil has to be supplied in order to reduce friction generated between the components configuring the compression unit, and the oil may be injected in a base 112 of the hermetic container 110 for storage. The injected oil may be supplied into the compression unit and to the first to third bearing layers through an oil passage 180, which is formed within the rotation shaft 143.

An unexplained reference numeral 152 denotes an inlet, 153 denotes an outlet, SP denotes a suction pipe, and DP denotes a discharge pipe.

For the related art scroll compressor, ring-shaped journal bearings are used instead of the first to third bearing layers. These journal bearings have a thickness of about 2 mm. On the other hand, the first to third bearing layers according to the present disclosure can sufficiently exhibit wear-resistance and lubricating effect even with a thickness of about 0.1 mm. Therefore, the first to third bearing layers according to the present disclosure may provide the similar wear-resistance to the related art, even with a much thinner thickness than the journal bearings of the related art.

The reduced thickness may result in a reduction of a size of the scroll compressor, and be utilized to provide a higher compression ratio with respect to the same size. In addition, for a scroll compressor, in order to prevent an orbiting scroll from being moved back due to gas pressure, back pressure has to be applied to a rear surface of the orbiting scroll. The back pressure may be applied by introduction some of compression gas existing in the compression chamber. In the case of using the bearing in the related art, it may be often difficult to increase a size of the bearing by a desired level due to the back pressure supply structure. However, the exemplary embodiment according to the present disclosure may overcome the design limitation.

Figure 5:
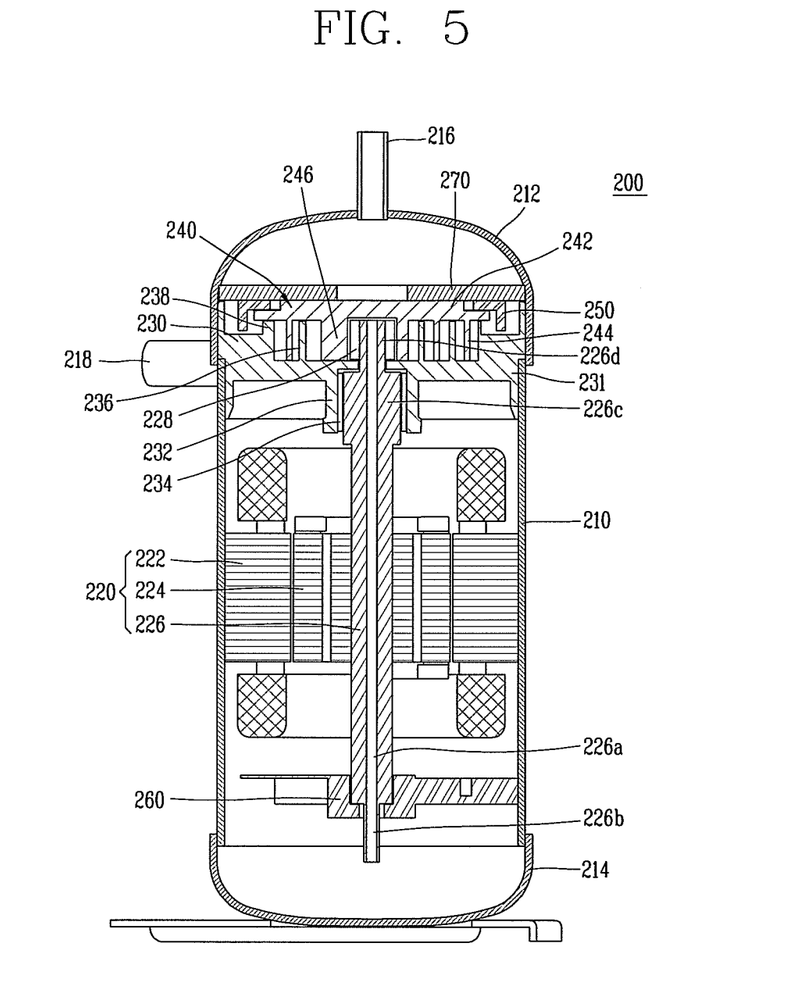
FIG. 5 is a sectional view schematically illustrating an internal structure of a scroll compressor, to which another exemplary embodiment of a surface treating agent according to the present disclosure is applied.

In the meantime, the present disclosure may also be applied to a so-called "through-spindle" type scroll compressor in which a main frame is omitted and a fixed scroll also functions as the main frame. The term "through spindle" is given by considering that a rotation shaft is inserted through a disc of the fixed scroll. FIG. 5 illustrates a second exemplary embodiment of a scroll compressor that the scope of the present disclosure is applied to the through-spindle type scroll compressor.

As illustrated in FIG. 5, a scroll compressor 200 according to a second exemplary embodiment may include a casing 210 having an upper shell 212 and a lower shell 214. The upper shell 212 and the lower shell 214 may be welded onto the casing 210 so as to form one hermetic space together with the casing 210.

A discharge pipe 216 may be installed on the upper shell 212. The discharge pipe 216 may correspond to a passage through which a compressed refrigerant is discharged to the outside. An oil separator (not shown) for separating oil which is mixed with a discharged refrigerant may be connected to the discharged pipe 216. A suction pipe 218 may be installed on a side surface of the casing 210. The suction pipe 218 may be a passage through which a refrigerant to be compressed is introduced. FIG. 5 illustrates that the suction pipe 218 is located on a boundary surface between the casing 210 and the upper shell 212, but the position may be randomly set. In addition, the lower shell 214 may also be used as an oil chamber for storing oil to be supplied for allowing the compressor to smoothly operate.

A motor 220 as a driving unit may be installed in an approximately central portion of the casing 210. The motor 220 may include a stator 222 fixed to an inner surface of the casing 210, a rotor 224 located in the stator 222 and rotatable by an interoperation with the stator 222, and a rotation shaft 226 disposed in a center of the rotor 224 such that the rotor 224 and the rotation shaft 226 can rotate together.

An oil passage 226a may be formed in the central portion of the rotation shaft 226 and extend along a lengthwise direction of the rotation shaft 226. An oil pump 226b for upwardly supplying oil stored in the lower shell 214 may be installed on a lower end portion of the rotation shaft 226. The oil pump 226b may be configured by forming a spiral groove in the oil passage, installing a separate impeller, or installing a separate displacement pump.

A diameter-extending portion 226c, which is inserted in a boss formed on a fixed scroll to be explained later, may be disposed on an upper end portion of the rotation shaft 226. The diameter-extending portion 226c may have a diameter greater than the other part of the rotation shaft 226. A pin 226d may be formed on an end of the diameter-extending portion 226c. An eccentric bearing layer 228 may be located on the pin 226d.

A fixed scroll 230 may be mounted onto a boundary portion between the casing 210 and the upper shell 212. The fixed scroll 230 may have an outer circumferential surface which is press-fitted between the casing 210 and the upper shell 212 in a shrinkage fitting manner, or welded together with the casing 210 and the upper shell 212.

A boss 232, in which the rotation shaft 226 is inserted, may be formed on a lower surface of the fixed scroll 230. A through hole through which the pin 226d of the rotation shaft 226 is inserted may be formed on an upper surface (see FIG. 4) of the boss 232. Accordingly, the pin 226d may protrude to an upper side of a disc 231 of the fixed scroll 230. A first bearing layer 234 for reducing friction against the rotation shaft 226 may be disposed on an inner surface of the boss 232.

A fixed wrap 236, which forms a compression chamber by being engaged with an orbiting wrap to be explained later, may be formed on an upper surface of the disc 231. A side wall 238, which forms a space for accommodating an orbiting scroll 240, which will be explained later, and comes in contact with an inner circumferential surface of the casing 210 may be formed on an outer circumferential surface of the disc 231.

An orbiting scroll 240 may be installed on the fixed scroll 230. The orbiting scroll 240 may include a disc 242 having an approximately circular form, and an orbiting wrap 244 engaged with the fixed wrap 236. A rotation shaft coupling portion 246 formed similar to a circular shape may be formed in a center of the disc 242. The eccentric bearing layer 228 may be rotatably inserted into the rotation shaft coupling portion 246. An outer circumferential portion of the rotation shaft coupling portion 246 may be connected to the orbiting wrap 244, so as to form a compression chamber together with the fixed wrap 236 during a compression process.

In the meantime, the eccentric bearing layer 228 may be formed on the rotation shaft coupling portion 246. An end portion of the rotation shaft 226 may be inserted through the disc 231 of the fixed scroll 230. The orbiting wrap 244, the fixed wrap 236 and the eccentric bearing layer 228 may be installed to overlap together in a lateral direction of the compressor. During compression, a repulsive force of a refrigerant may be applied to the fixed wrap 236 and the orbiting wrap 244, and a compression force may be applied as a reaction force between a rotation shaft supporting portion and the eccentric bearing layer 228. When a part of a shaft is inserted through the disc 231 of the fixed scroll 230 to overlap the fixed wrap 236, the repulsive force of the refrigerant and the compression force may be applied to the same side surface based on the disc so as to be offset by each other. This may prevent an inclination of the orbiting scroll 240 due to the operations of the compression force and the repulsive force.

Although not shown, a discharge opening may be formed on the disc 242 of the orbiting scroll 240 such that a compressed refrigerant can be discharged into the casing therethrough. A position of the discharge opening may be randomly set, taking into account discharge pressure or the like.

An Oldham ring 250 for preventing rotation of the orbiting scroll 240 may be installed on the orbiting scroll 240. In the meantime, a lower frame 260 for rotatably supporting a lower side of the rotation shaft 226 may be installed in a lower portion of the casing 210, and an upper frame 270 for supporting the orbiting scroll 240 and the Oldham ring 250 may be installed on an upper surface of the orbiting scroll 240. A hole, which communicates with the discharge opening of the orbiting scroll 240 such that the compressed refrigerant can be discharged toward the upper shell 212, may be formed on a central portion of the upper frame 270.

In accordance with the second exemplary embodiment having the configuration, the eccentric bearing layer 228 and the first bearing layer 234 may have the same structure and material as those of the first exemplary embodiment. Specifically, in the second exemplary embodiment, the rotation shaft coupling portion may be located on the central portion of the orbiting scroll. Accordingly, a space of the disc of the orbiting scroll to be utilized as a compression space may be remarkably reduced. Therefore, in order to obtain the same compression ratio as compared with other types of compressors, a through-spindle type scroll compressor should increase in size. However, according to the present disclosure, the thickness of the bearing may be remarkably reduced more than that of the related art bearing, which may result in minimization of the size increase of the compressor.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for forming a lubricating layer of a mechanical component, the method comprising:
    dispersing nanodiamond powder into a solvent;
    adding carbon nanotube powder into the nanodiamond solution;
    introducing a dispersing agent into the solution containing the added nanodiamond powder and carbon nanotube powder;
    dispersing nanodiamond powder and carbon nanotube powder contained in the dispersing agent-introduced solution;
    mixing the dispersing solution, in which the nanodiamond and the carbon nanotube powder are dispersed, with a PTFE solution to make a surface treating agent;
    coating the surface treating agent on the mechanical component; and
    sintering the coated surface treating agent, wherein the nanodiamond powder and the carbon nanotube powder are mixed such that a total weight of solids thereof corresponds to 0.1 to 5% by weight of the PTFE solution.

2. The method of claim 1, wherein the nanodiamond powder and the carbon nanotube powder are mixed in a ratio of 4:6 to 6:4.

3. The method of claim 1, wherein the solvent includes N, N-dimethylformamide (DMF).

4. The method of claim 1, wherein the dispersing the nanodiamond powder into the solvent includes:
    introducing the nanodiamond powder into a polar solvent; and
    dispersing the nanodiamond powder into the polar agent using attrition milling.

5. The method of claim 4, wherein 0.1 to 5.0% by weight of the nanodiamond powder is introduced with respect to 100% by weight of the polar solvent.

6. The method of claim 4, wherein, the nanodiamond powder is milled to have a particle diameter in a range of 0.1 to 1 mm upon the attrition milling.

7. The method of claim 1, wherein in the introducing the dispersing agent into the solution containing the added nanodiamond powder and carbon nanotube powder, 1 to 5% by weight of the dispersing agent is introduced with respect to a solid of the carbon nanotube powder.

8. The method of claim 7, wherein the dispersing agent is one of surfactant, polymer coating material, or silane coupling agent.

9. The method of claim 1, wherein in the dispersing the nanodiamond powder and carbon nanotube powder contained in the dispersing agent introduced solution, the nanodiamond powder and the carbon nanotube powder are dispersed using an ultrasonic dispersion system.

10. The method of claim 9, wherein the dispersing the nanodiamond powder and carbon nanotube powder contained in the dispersing agent-introduced solution is executed for 1 to 60 minutes using the ultrasonic dispersion system.

11. The method of claim 1, wherein the surface treating agent is, coated by screen printing, spray coating or flow coating.

12. The method of claim 1, wherein the sintering executed at a temperature in a range of 100 to 300° C.

* * * * *